United States Patent [19] [11] 4,209,400
Mayes [45] Jun. 24, 1980

[54] OIL SPILL CLEANUP METHOD AND APPARATUS

[75] Inventor: Fred M. Mayes, Malvern, Pa.

[73] Assignee: Suntech, Inc., Philadelphia, Pa.

[21] Appl. No.: 26,639

[22] Filed: Apr. 3, 1979

Related U.S. Application Data

[63] Continuation-in-part of Ser. No. 875,277, Feb. 6, 1978, abandoned.

[51] Int. Cl.$^2$ ............................................. E02B 15/04
[52] U.S. Cl. ..................................... 210/65; 180/116; 210/DIG. 25; 210/83; 210/242 S
[58] Field of Search .......... 210/65, 83, 242, DIG. 25, 210/26; 180/116, 117, 118, 120, 123, 124

[56] References Cited

U.S. PATENT DOCUMENTS

| | | | |
|---|---|---|---|
| 3,153,461 | 10/1964 | Bullum, Jr. | 180/116 |
| 3,348,690 | 10/1967 | Cornelissen | 210/DIG. 25 |
| 3,512,603 | 5/1970 | Crewe et al. | 180/124 |
| 3,615,017 | 12/1969 | Valdespino | 210/DIG. 25 |
| 3,631,984 | 1/1972 | Rath | 210/DIG. 25 |
| 3,650,406 | 3/1972 | Brown et al. | 210/DIG. 25 |
| 3,666,098 | 5/1972 | Gerland et al. | 210/DIG. 25 |
| 3,730,346 | 5/1973 | Prewitt | 210/DIG. 25 |
| 3,753,496 | 8/1973 | Boyd | 210/DIG. 21 |
| 3,810,522 | 5/1974 | Morgan et al. | 118/116 |
| 4,052,313 | 10/1977 | Rolls | 210/DIG. 26 |

Primary Examiner—Theodore A. Granger
Attorney, Agent, or Firm—J. Edward Hess; Donald R. Johnson; Paul Lipsitz

[57] ABSTRACT

A method for removing oil from the surface of water where an oil spill has occurred, particularly in obstructed or shallow areas, which comprises partially surrounding a hovercraft with a floating oil-collecting barrier, there being no barrier at the front of the hovercraft, moving the oil-barrier-surrounded-hovercraft into oil contaminated water, and collecting oil gathered within the barrier behind the hovercraft through a suction line which carries the oil to a storage tank aboard the hovercraft. The invention also embodies the hovercraft adapted to effect an oil spill cleanup.

6 Claims, 3 Drawing Figures

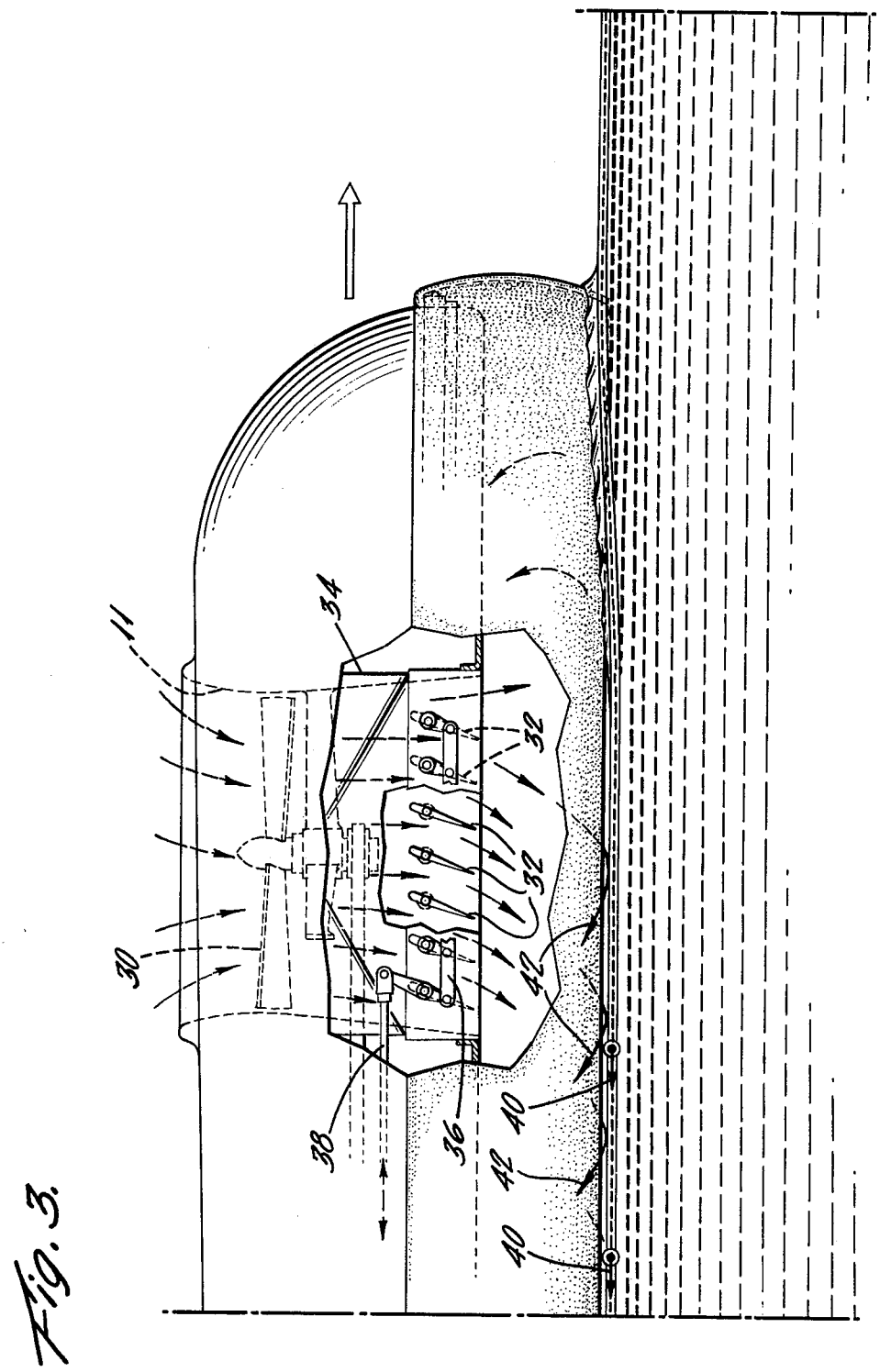

OIL SPILL CLEANUP METHOD AND APPARATUS

This application is a continuation-in-part of Ser. No. 875,277, filed Feb. 6, 1978, now abandoned.

Numerous devices have been described for removing oil from the surface of large bodies of water where oil spills have occurred. In U.S. Pat. No. 3,615,017 for example an oil entrapment water craft is described wherein a pair of pontoons supports a tower into which oil is pumped from the water. Devices such as these, however, require significant depth of water to support the floating water craft and, also, are incapable of getting into areas which have obstructions rising out of the water. U.S. Pat. No. 3,659,713 discloses a floating vessel having a pair of elongated booms from which an elongated fluid stream (preferably gaseous) impinges on the water surface to sweep and concentrate floating oil between the booms from which the concentrated oil is removed. This device, also, requires water of significant depth and is not usable in obstructed areas. U.S. Pat. No. 3,666,098 discloses a method of confining and collecting oil from a body of water by moving the oil on a slick through perforations in a floating oil collecting boom and pumping the oil within the boom to a collection receptacle. This patent gives a good summary of the prior art pertinent to floating barrier type collection devices for oil on water.

It is an object of this invention to provide a means to effectively clean up oil spills, particularly in areas which have generally been inaccesible heretofore by floating devices. A second object of the invention is to provide an apparatus to effects such cleanup.

In accord with the invention a method and apparatus is provided for removing oil from the surface of water, particularly in obstructed or shallow areas where an oil spill has occurred. The invention comprises partially surrounding ahovercraft with a floating oil-containment barrier, there being no barrier at the front of the hovercraft, moving the oil-barrier-surrounded-hovercraft into oil contaminated water and collecting oil gathered within the barrier behind the hovercraft through a suction line from which the oil is conducted to storage tanks aboard the craft. The oil on the water's surface is directed within the barrier and concentrated therein by means aboard the hovercraft to direct air exiting from under the skirts of the vessel onto the floating oil to sweep it into the barrier area for recovery.

FIG. 3 is an enlarged fragmentary side elevational view of the forward or bow portion of the hovercraft shown in FIGS. 1 and 2, with portions broken away to show details of the assembly for directing the oil film adjacent the hovercraft in a rearward direction within the barrier where it is skimmed off by the pumps.

Figure 1:
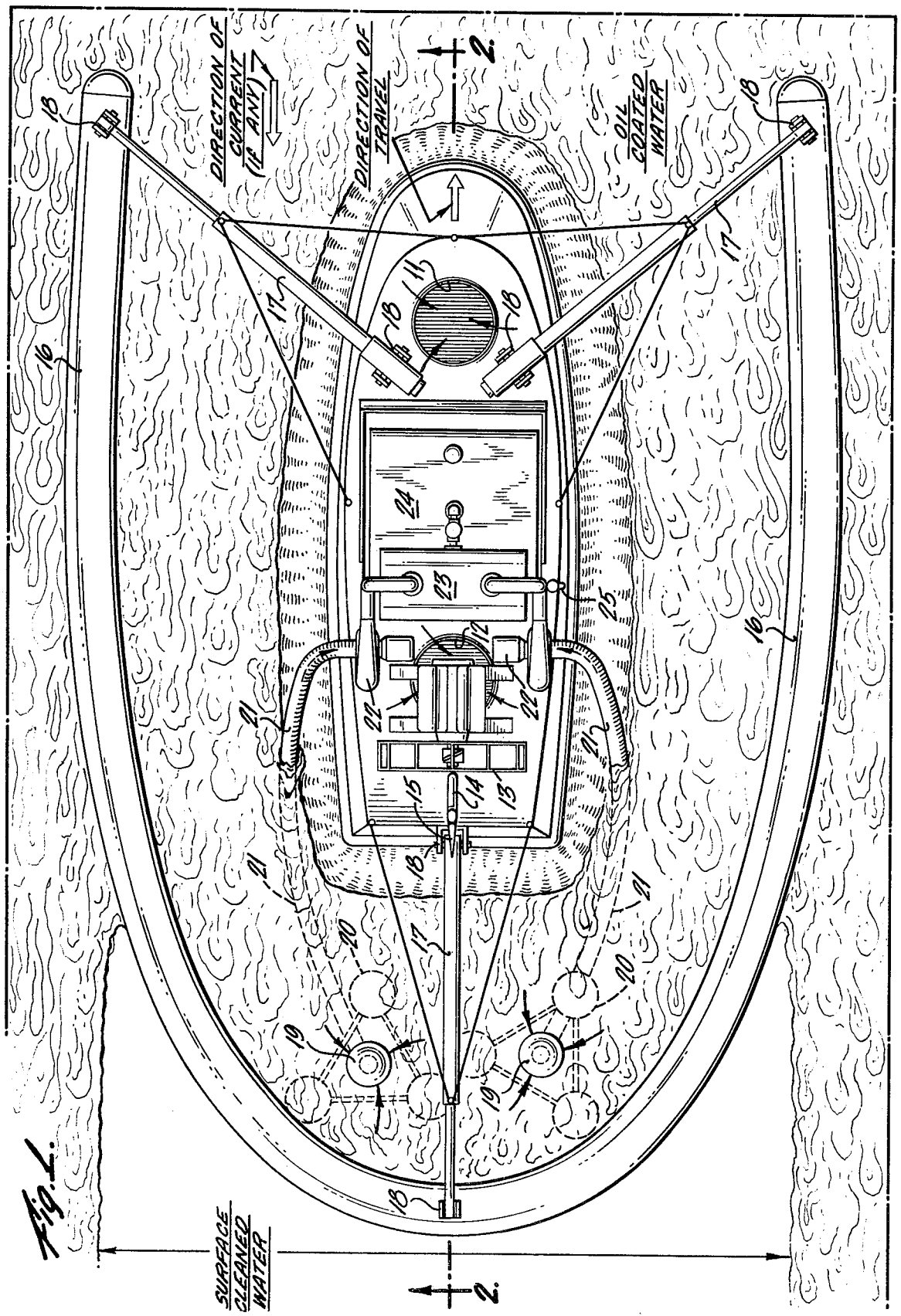
FIG. 1 is an illustration of the invention showing a small hovercraft as viewed from above and equipped with the necessary devices to perform an oil skimming operation in confined areas, or on a small scale operation.
Figure 2:
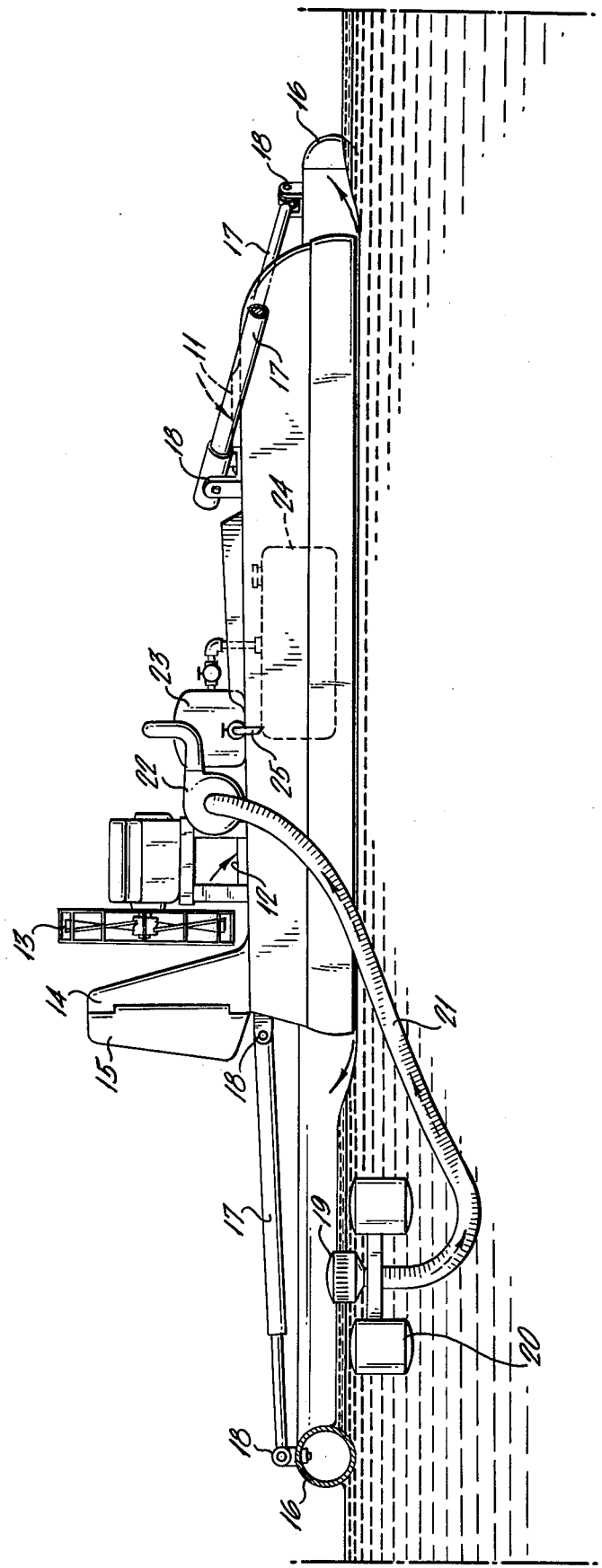
FIG. 2 is a side elevation of the invention taken on the line 2—2 of FIG. 1.

Referring now to FIGS. 1 and 2, a small hovercraft is shown having two intake ports on its upper deck; one in the bow section (11) and, another just to the rear of the hovercraft's beam (12). Air drawn through these ports and forced downwardly against water or other surface beneath the hovercraft supports the craft in the usual manne of hovercraft operation.

The hovercraft shown, is capable of forward motion as well as making course changes. This is accomplished either by deflection of the air supporting the craft or, preferably, by means of a small motor driven propeller (13) and an aircraft type fin (14) and rudder (15) arrangement behind the propeller (13). By use of this design neither the propulsion means nor course changes create any unwanted turbulence to the oil coated water. It would also be possible to attach lines to the hovercraft and guide it manually if desired. The hovercraft shown may be piloted by personnel aboard or may be directed by remote control.

The hovercraft is fitted with a flexible horseshoe shaped oil-barrier dam (16) supported in a predetermined shape and size by telescoping outriggers (17) that are in turn secured to both the hovercraft and dam by means of articulated fittings (18). This arrangement allows the varied undulations of craft and dam which will occur, but permits the barrier to maintain an oil seal along its perimeter in contact with the water. The oil-barrier dam will be a highly flexible, tubular material which is impermeable to oil such as canvas, natural or synthetic rubber, woven nylon, polyester fabric and the like and such fabrics may be impregnated or laminated with a rubber-like material such as neoprene. Such oil-barrier dams are well known in the art.

The hovercraft is further fitted with oil reclaiming means, such as a conventional oil skimmer which may be a buoyant intake head (19) (2 systems are shown in FIG. 1) on a floating support (20). This device is attached to a flexible hose (21) which in turn, is connected to a pump (22) which discharges into an oilwater separation tank (23) and thence to a large storage tank aboard the craft (24). The water which settles in tank 23 is drained overboard through a discharge pip (25) (see FIG. 2). It will be understood that the pump (22) need not necessarily be aboard the craft, but may be of a type that floats in the water near the craft.

Referring now to FIG. 3, air is drawn into the inlet duct 11 by the fan 30. The air stream is directed downwardly and through a system of adjustably positioned, transversely extending, parallel mounted vanes 32. The vanes 32 are rotatably mounted within the cowling 34 and are ganged for angular positioning with respect to the axial center line of the cowling by means of a common horizontal extending link 36 and a push or pull control rod 38. As shown in FIG. 3 the vanes 32 have been positioned at an angle to the downwardly directed air stream. The air stream is deflected in a rearward direction and as the rearwardly directed air stream contacts the oil film on the water, a tangental, rearwardly extending motion is imparted to the oil film as shown by the arrows 40. Air escaping from under the hovercraft skirt shown by arrows 42 also imparts to the adjacent oil film and water a rearwardly directed motion to the oil film contained within the barrier 16. The oil film is then skimmed off by the pumps 22 (FIG. 1).

This system may be used in conjunction with the pusher propeller motive system shown in FIGS. 1 and 2 or if desired forward or rearward motion of the hovercraft can be achieved through the angular displacement of the air stream by the positioning of the vanes 32 alone. While only the forward or bow duct 11 has been illustrated the rear or stern duct 12 may also be of the same construction as described above and can be used in tandem or singly to achieve the desired effect.

In operation, the hovercraft, outfitted as described above, is maneuvered into oil-contaminated water and propelled, preferably against the current flow, so that the oil covered water is gathered into the area created by the horseshoe shaped dam. The floating oil is sucked into the suction head and flows into the oil-water separation tank and thence to the storage tank from which it is recovered. In this way the modified hovercraft is able to clean the water and provide for recovering of the valuable oil.

The invention claimed is:

1. A method to recover oil from the surface of oil contaminated water which comprises partially surrounding a hovercraft with a floating oil barrier, said hovercraft being fitted with means to direct air onto the oil contaminated water to sweep it within said barrier, moving the hovercraft into said oil contaminated water and collecting oil gathered within the barrier behind the hovercraft through a suction line from which the oil is conducted to storage tanks aboard the craft.

2. The method of claim 1 wherein adjustable vanes on said hovercraft direct air onto the oil contaminated water.

3. A method to recover oil from the surface of water which comprises fitting a hovercraft with an oil-gathering barrier surrounding the sides and rear of said hovercraft, said barrier being supported by outriggers attached to said hovercraft, said hovercraft being fitted with means to direct air onto the oil contaminated water to sweep it within said barrier, providing a buoyant oil intake suction head floating in the oil-contaminated water within the oil barrier, connecting said floating suction head by a hose to a pump aboard said hovercraft, maneuvering said hovercraft in the oil-contaminated water, and pumping oil which enters said suction head to a storage tank aboard said hovercraft.

4. The method of claim 3 wherein adjustable vanes on said hovercraft direct air over the oil contaminated water.

5. A hovercraft adapted to recover oil from oil-contaminated waters which comprises a hovercraft, a floating dam surrounding the sides and rear of said hovercraft, said dam being supported by outriggers attached to said hovercraft, an oil storage tank aboard said hovercraft, and pumping means adapted to transfer oil collected by a skimmer in the oil contaminated water within the barrier to said storage tank, said hovercraft being fitted with means to direct air onto the oil-contaminated water to sweep it within said barrier for recovery.

6. The hovercraft of claim 5 wherein adjustable vanes direct air onto the oil-contaminated water.

* * * * *